United States Patent [19]

Schulten et al.

[11] Patent Number: 5,236,638
[45] Date of Patent: Aug. 17, 1993

[54] PROCESS FOR PRODUCING A SHAPED BODY OF GRAPHITE

[75] Inventors: Rudolf Schulten; Behzad Sahabi, both of Aachen, Fed. Rep. of Germany

[73] Assignee: Huls Aktiengesellschaft, Marl, Fed. Rep. of Germany

[21] Appl. No.: 931,699

[22] Filed: Aug. 18, 1992

[30] Foreign Application Priority Data

Aug. 21, 1991 [DE] Fed. Rep. of Germany ....... 4127693

[51] Int. Cl.$^5$ ................ C01B 31/00; C04B 35/54
[52] U.S. Cl. ................... 264/29.5; 264/22; 264/60; 264/62; 264/67
[58] Field of Search ............ 264/29.5, 60, 62, 67, 264/22

[56] References Cited

U.S. PATENT DOCUMENTS

| | | | |
|---|---|---|---|
| 2,938,807 | 5/1960 | Anderson | 264/63 |
| 3,886,246 | 5/1975 | Kennedy | 264/67 |
| 4,067,955 | 1/1978 | Noakes | 264/29.5 |
| 4,293,512 | 10/1981 | Luhleich | 264/60 |
| 4,789,506 | 12/1988 | Kasprzyk | 264/60 |

*Primary Examiner*—James Derrington
*Attorney, Agent, or Firm*—Mark T. Basseches

[57] ABSTRACT

For the production of a shaped body of graphite with a reaction-bound Si/SiC coating it is proposed to bring the shaped body—provided with a slip layer of a homogenized mixture, heated and gassed under vacuum with gaseous silicon or impregnated with liquid silicon—to a form of predetermined dimensions. To this end the shaped body is treated after the coating by cutting or brushing or by electronically controlled laser erosion or by several of these measures.

9 Claims, No Drawings

PROCESS FOR PRODUCING A SHAPED BODY OF GRAPHITE

BACKGROUND AND FIELD OF THE INVENTION

The invention relates to a process for producing a shaped body of graphite provided with an oxidation-resistant layer. The shaped body is first dried and provided with a slip layer. The latter consists of a homogenized mixture which contains SiC powder of different grain sizes, fine-grained graphite powder, resin, dispersing agent, and distilled water. For crosslinking the resin contained therein, the coating is heated to a temperature of about 100 degrees C., and thereafter, for burning off the resin, to a temperature for instance of between about 900 degrees C. and 1000 degrees C. Lastly the shaped body thus coated is either gassed with gaseous silicon under vacuum at a temperature of for instance 1500 degrees C. to 1800 degrees C or impregnated with liquid silicon.

THE PRIOR ART

Such a process is known from A. M. Hurtado-Gutierrez: "Studies on massive air intrusion in high-temperature reactors", Dissertation at the RWTH Aachen, 1990, pp 81-107. The process aims to obtain an improved corrosion protection and sealing effect on the surface of shaped bodies of graphite, using reaction-bound silicon/silicon carbide (Si/Sic) layers. In shaped bodies treated by infiltration with liquid Si, the latter penetrates, because of its extreme wetting capacity, not only into the pores of the applied cracked slip layer, but moreover also some 100 micrometers deep into the open pores of the graphite material. The depth of penetration can be varied by selection of the pore size in the shaped body.

Depending on the selection of the composition of the slip, there forms after cooling a layer of reaction-bound SiC having a free Si content in the range of 6 to 20% Through the free Si in the pores of the applied layer and of the shaped body, these are intertwined. Because of Si dioxide formation, the applied Si/SiC layers prove to be impermeable and corrosion-resistant in air up to 1600 degrees C. The tensile strength, especially at high temperatures, exceeds that of the best steel grades. Moreover, a high impact strength of the layers is obtained (Cf. J. Kreigsmann: "The technologies of modern silicon carbide ceramics", Keram. Z. 40 (1988), [11,12], 41 (1989 [11]).

Shaped bodies produced by the known process show, both before and after the application of the oxidation-resistant layer, unintended deviations in their dimensions. Also, the adhesion between the graphite surface and the oxidation-resistant layers is not sufficient for every area of use of the shaped bodies. Lastly, it is desirable also to increase the elasticity and thermo-stability of the shaped bodies thus coated.

SUMMARY OF THE INVENTION

It is an object of the invention to develop a process of the initially described kind so that shaped bodies produced by it can be used also in high-stress applications, for example as high-temperature linings of combustion chambers, for the production of heat-resistant pipes, as turbine vanes in the high temperature range over 1400 degrees C., as oxidation-protected fuel elements in nuclear reactors, and as components in other high-temperature ranges in oxidative atmosphere.

To achieve this result, there is provided a shaped body of graphite which is dried and provided with a slip layer or coating comprised of a homogenized mixture of SiC powder of different grain sizes, finely divided graphite powder, binder (resin), dispersing agent and distilled water. The coated body is first heated to a temperature of about 100 degrees C. to drive off solvents and cure (crosslink) the resin components of the coating The body is thereafter heated to 900 degrees C. to 1000 degrees C. to effect cracking (burn off) of the resin components. The shaped body is thereafter heated to a temperature of from about 1500 degrees C. to 1800 degrees C. in gaseous silicon atmosphere or impregnated with liquified silicon. The thus treated body is shaped, e.g. by laser erosion, cutting or grinding to bring the body to a desired shape and dimension. The reshaped body is coated and treated as above, the treatment, i.e. shaping, coating, etc., being carried out until the desired dimensions and characteristics are achieved With the process according to the invention also parts of a complicated from, such a turbine vanes, can be produced with close tolerances, the coating thickness being taken into consideration already in shaping the as yet uncoated body.

To enhance the reliability of the oxidation protection, a variant of the process according to the invention provides applying on the shaped body successively several oxidation-resistant layers, the shaped body being again changed to a predetermined form of increasingly larger dimensions after application of each layer.

To avoid direct touching of the shaped body, according to a further variant of the process of the invention the shaped body is suspended from at least one SiC fiber for applying the slip by immersion in the liquid slip composition and for handling during the subsequent silicizing process.

DETAILED DESCRIPTION OF INVENTION

After the immersion in the liquid slip and after the drying and curing at about 100 degrees C., the slip layer applied on the shaped part is wrapped preferably in a plastic foil, and is compacted isostatically in a liquid, for instance water, under a pressure of 100 to 500 bars.

After removal of the plastic foil, if the precision of the tolerances so requires, the slip layer is repeatedly treated and shaped with electronically controlled laser erosion. Thereafter the coated shaped body, hanging from the SiC fiber, is gassed with Si in known manner at temperatures of 1500 to 1800 degrees C. or is silicized by infiltration and subsequently cooled.

For a number of applications of the shaped body it is advantageous, according to a further variant of the process of the invention, after the silicizing of the slip, to transform the free Si present in the pores superficially by gassing with hydrocarbons, nitrogen, oxygen or other gases at temperatures for instance of 1400 degrees to 1700 degrees C. into carbide, nitride, oxide or other substances of high melting point.

The quality of the Si/SiC corrosion layers on the graphite body can be improved by additions of metals of high melting point or respectively metal silicides, in particular molybdenum silicide. By adding for example molybdenum silicide in 10 to 20 vol. % to the slip, the permissible operating temperature and the corrosion resistance of the shaped body are noticeably increased. The coefficient of thermal expansion of the Si/SiC, which normally is approximately identical with that of the coated graphite material, is increased somewhat by this addition. This has two effects: On the one hand the tensile strength is somewhat reduced, on the other hand a remarkable shrinking on of the layer on the shaped body occurs after the silicizing process because of the increased coefficient of expansion upon cooling At high temperatures of use of the shaped body, the partial pressure of the free Si is lowered by the presence of the molybdenum silicide, so that an operating temperature of the shaped body above the melting point of the Si of 1420 degrees C. becomes possible Lastly, a variant of the process according to the invention provides adding to the slip to be applied in several layers, fibers of carbon and SiC having a diameter of about 10 micrometers and lengths of about 100 to 1000 micrometers.

The adhesion of the individual layers to one another is considerably improved by the fibers. Already in the composition of the mixture for the slip a part of the SiC powder and carbon can be replaced by fibers of SiC and carbon, so that after application of the slip an adequate number of fiber ends protrudes outward from the slip surface. For a slip layer of thickness of 0.1 to 3 mm curled fibers are suitable. The fiber ends of the SiC remain intact in the silicizing process, whereas the fibers of carbon are partially converted to SiC. They ensure an anchoring of the slip for a layer to be applied subsequently and constitute after the following silicizing process a firm adhesion for the next layer.

Having thus described the invention and illustrated its use, what is claimed as new and is desired to be secured by Letters Patent is:

1. The method of producing a shaped body of graphite having an oxidation resistant exterior layer comprising the steps of:
   a. providing a dried pre-shaped graphite body;
   b. coating said body with a liquid slip layer of a suspension comprised SiC powder of a variety of grain sizes, graphite powder, resin, dispersing agent and water;
   c. heating said coated body to drive off the liquid components of said coating and crosslink said resin;
   d. thereafter heating said body to a temperature sufficient to burn-off said resin;
   e. thereafter impregnating said body while the same is heated to a temperature of from about 1500 degrees C. to 1800 degrees C. with silicon;
   f. shaping said impregnated body to a desired shape and dimension;
   g. thereafter repeating at least once steps b through f.

2. The method of claim 1 wherein at least some of steps b, c, e and g are carried out by suspending said body using at least one fiber made of SiC.

3. The method of claim 1 and including the step of encasing the coated body of step c in a flexible foil, and subjecting said encased body to isostatic compaction under pressures in the range of from about 100 to 500 bars.

4. The method of claim 1 and including the step of heating the body resulting from step g from a temperature of from about 1400 degrees C. to 1700 degrees C. while said body is in a gaseous environment of a gas reactive with free Si.

5. The method of claim 1 wherein said gaseous environment is selected from the group consisting of hydrocarbons, nitrogen and oxygen.

6. The method of claim 1 wherein said slip includes 10 to 20 percent by volume molybdenum.

7. The method of claim 1 wherein said slip includes 10 to 20 percent by volume molybdenum silicide.

8. The method in accordance with claim 1 wherein said slip includes fibers of carbon and SiC.

9. The method of claim 8 wherein said fibers have an average diameter of about 10 micrometers, and a length in the range of from about 100 to 1000 micrometers.

* * * * *